United States Patent [19]

Jones et al.

[11] Patent Number: 6,041,107

[45] Date of Patent: Mar. 21, 2000

[54] TELEPHONE EXTENSION SWITCH HOOK STATE DETECTION SYSTEM

[75] Inventors: Eric A. Jones, Glendale; Greig R. Detering, Phoenix, both of Ariz.

[73] Assignee: AG Communication Systems Corporation, Phoenix, Ariz.

[21] Appl. No.: 09/070,058

[22] Filed: Apr. 30, 1998

[51] Int. Cl.[7] .................................................. H04M 1/00
[52] U.S. Cl. ............................................ 379/164; 379/377
[58] Field of Search ..................................... 379/167, 164,
379/165, 171, 362, 252, 377, 106.08, 161,
179, 381–383, 385–387

[56] References Cited

U.S. PATENT DOCUMENTS

| | | | |
|---|---|---|---|
| 4,680,783 | 7/1987 | Boeckmann . | |
| 4,760,592 | 7/1988 | Hensley . | |
| 4,802,207 | 1/1989 | Uchida | 379/164 |
| 4,817,137 | 3/1989 | Rosenfeld et al. | 379/377 |
| 4,847,896 | 7/1989 | Siligoni et al. | 379/377 |
| 5,388,153 | 2/1995 | Burger et al. | 379/164 |
| 5,402,482 | 3/1995 | Minohara et al. | 379/161 |
| 5,506,891 | 4/1996 | Brown | 379/377 |
| 5,570,418 | 10/1996 | Wu et al. | 379/161 |
| 5,592,529 | 1/1997 | Linsker | 379/377 |
| 5,606,593 | 2/1997 | Smith | 379/33 |
| 5,668,870 | 9/1997 | Dahlquist | 379/164 |
| 5,706,342 | 1/1998 | Baeder et al. | 379/382 |
| 5,768,363 | 6/1998 | Daurtartas et al. | 379/377 |
| 5,809,132 | 9/1998 | Sakamoto | 379/161 |
| 5,844,977 | 12/1998 | McKinney et al. | 379/164 |
| 5,850,436 | 12/1998 | Rosen et al. | 379/377 |
| 5,937,058 | 8/1999 | Bleile et al. | 379/377 |

*Primary Examiner*—Paul Loomis
*Assistant Examiner*—Rexford Barnie
*Attorney, Agent, or Firm*—David J. Zwick

[57] ABSTRACT

A computer integrated telephony system embodied in a PC that includes a telephony interface connected to the local loop that detects whether one or more extension phones are off-hook by using the signal generating and detection capabilities found on a typical telephony interface card. In the preferred embodiment, the telephony interface is based on a programmable DSP that generates and injects onto the local loop a subsonic signal having a known shape and amplitude. If one or more extensions are off-hook, the amplitude of the subsonic signal detected on the line will be significantly attenuated. The amplitude of the detected signal is compared against a threshold value and an indication is made if the detected signal amplitude is below the threshold value.

11 Claims, 3 Drawing Sheets

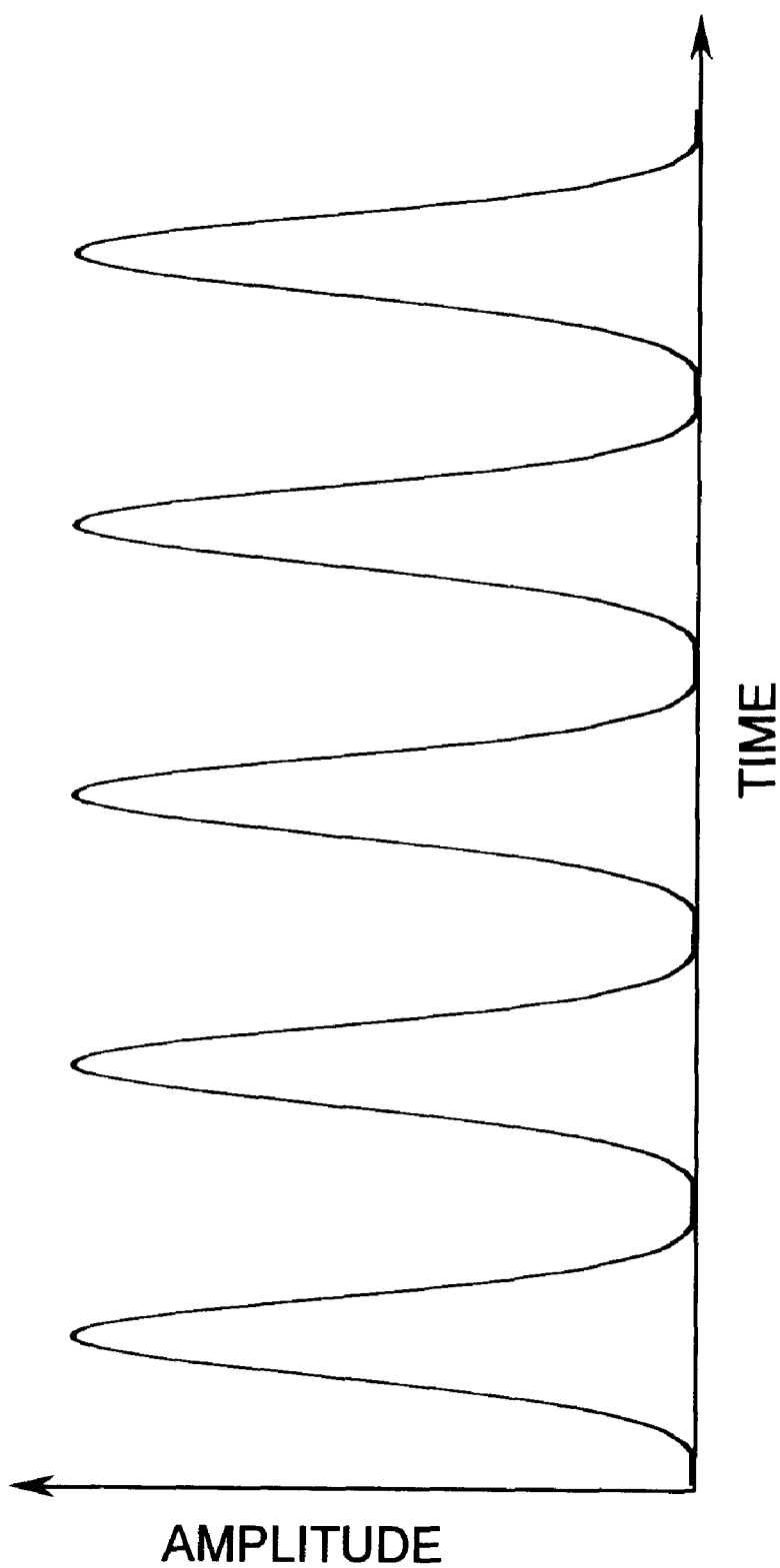

TELEPHONE EXTENSION SWITCH HOOK STATE DETECTION SYSTEM

FIELD OF THE INVENTION

The present invention relates to the field of computer telephony, and more particularly to detecting an off-hook extension phone.

BACKGROUND OF THE INVENTION

In a telephone system, there can be many circumstances where it would be desirable to be able to detect when an extension phone is off-hook. For example, during a data transmission to a PC, it may be desirable for the PC to be able to detect if an extension goes off-hook so as to stop transmission or take other measures to preserve data integrity. Also, in the Analog Display Services Interface (ADSI) protocol, a requirement of the protocol is that an ADSI phone instrument must be able to detect at all times the use of other extension phones when the ADSI phone is either on-hook or off-hook. When the ADSI phone detects that an extension is off-hook, the ADSI phone must not start an ADSI data transmission, but may finish receiving any ADSI transmission. This reduces the chances of inflicting loud and harsh signal noise from the handset upon the user of an extension phone, and also makes the phone line available for potential emergency calls. Also, it may be desirable to know if someone may be eavesdropping on an extension phone.

Each of the above examples, and in fact many more applications, is currently available as a computer integrated telephony (CIT) application wherein a general purpose computer, such as a PC, having a telephony interface interacts with the telephone network to provide the desired functionality.

Typically, detection of the hook state of an extension phone is accomplished by monitoring the voltage or current between the tip and ring of the phone line.

In the telephony interfaces of many CIT systems, the ability to monitor the voltage or current between the tip and ring is not provided. However, it is common for the telephony interface to have signal generating and detection capabilities. These telephony interfaces typically are able to generate and detect DTMF and FSK in-band signals. This signal generating and detection capability is usually manifested in a digital signal processor (DSP), which typically can be programmed to generate and detect a wide spectral range of signals.

Accordingly, it is an object of the present invention to provide a CIT system that has the ability to detect when an extension phone is off-hook by using the signal generating and detection capabilities found on a typical telephony interface card.

SUMMARY OF THE INVENTION

The preferred embodiment of the present invention is a CIT system having the ability to detect whether one or more extension phones are off-hook, or whether all extensions are on-hook. The invention is embodied in a PC that includes a telephony interface and interacts with a telephone network to provide the desired primary application functionality of the CIT application, and is also able to detect when an extension phones are off-hook or on-hook by using the signal generating and detection capabilities found on a typical telephony interface card.

In the preferred embodiment, the telephony interface is based on a programmable digital signal processor (DSP) that generates and injects onto the phone line a subsonic signal having a known shape and amplitude. If one or more extensions are off-hook, the amplitude of the subsonic signal detected on the line will be significantly attenuated. The amplitude of the detected signal is compared against a threshold value and an indication is made if the detected signal amplitude is below the threshold value.

DESCRIPTION OF THE DRAWINGS

FIG. 3 shows a plot of an example of an injected signal of the preferred embodiment of the present invention.

DESCRIPTION OF THE PREFERRED EMBODIMENT

Figure 1:
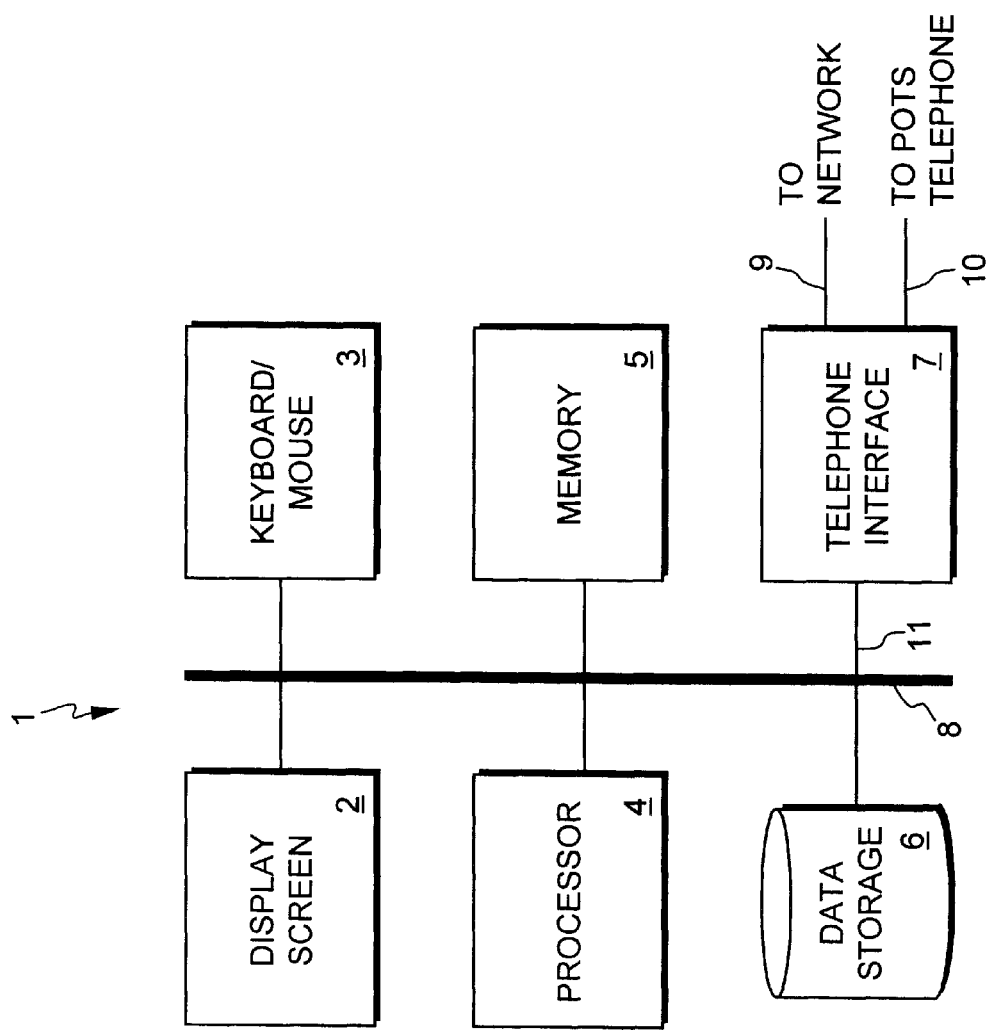
FIG. 1 shows a block diagram of the computer system in which the present invention operates.

FIG. 1 shows a general block diagram of computer system 1 of the preferred embodiment in which the present invention operates. Computer system 1 is preferably an IBM-compatible general purpose PC. Computer system 1 comprises processor 4, memory 5 comprising random access and read only memory for storing static and dynamic information and program instructions for processor 4, display screen 2, keyboard/mouse 3 for communicating commands and data to processor 4, and data storage 6 for storing data and program instructions. Telephone interface 7 for interacting with a telephone network is also installed in computer system 1. All of the aforementioned computer system components including telephone interface 7 are connected to system bus 8. Telephone interface 7 is further connected to the telephone network over connection 9.

Computer system 1 supports a CTI application, such as a computer based ADSI phone application, a personal call manager application or a data communications application. Data and program instructions for the application reside in data storage 6 and memory 5 and, among other things, control the operation of telephone interface 7. Telephone interface 7 exchanges control and data information with other computer system 1 components via system bus 8.

Telephone interface 7 supports communications between the CTI application on computer system 1 and the telephone network. The invention of applicants is one aspect of this communications, and provides a system to detect if an extension phone that is connected to the local loop portion of line 9 is off-hook. In general, the invention of applicants will share, in a multi-tasking or time sharing arrangement, circuitry and components of telephone interface 7 that are also used for other aspects of the communications between the CTI application on computer system 1 and the telephone network.

Certain CTI applications may require a regular telephone or a handset. Towards this end, a connection between telephone interface 7 and a regular telephone over connection 10 is shown.

Figure 2:
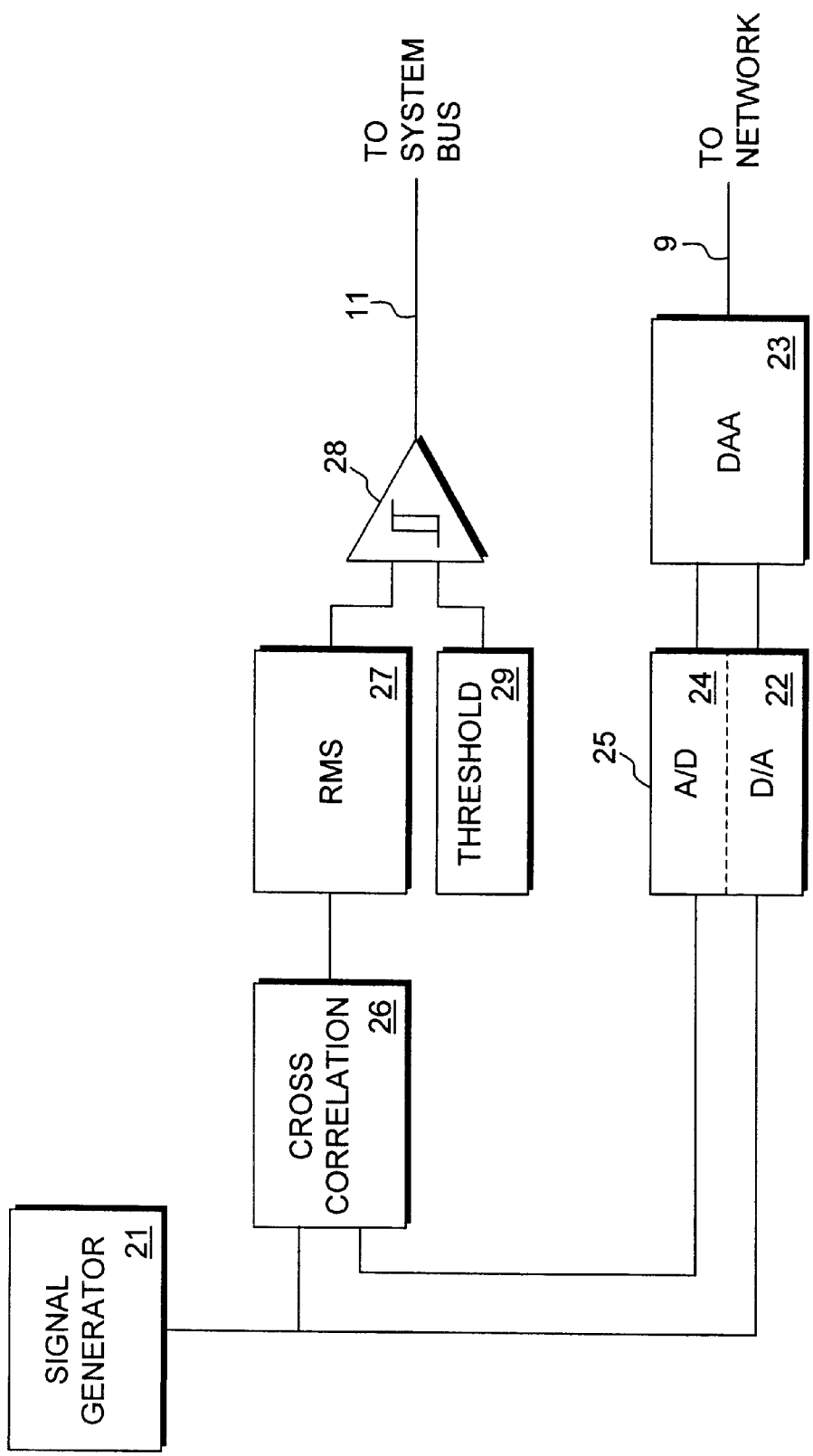
FIG. 2 shows a block diagram of the telephone interface of the present invention.

FIG. 2 shows a block diagram of the inventive aspects of telephone interface 7. Digital signal generator 21 produces a signal of known shape and amplitude and passes the signal to digital-to-analog converter D/A 22 of CODEC 25 and to cross correlation circuit 26. D/A 22 converts the digital signal to an analog signal and passes the analog signal to data access arrangement DAA 23 for injection onto line 9.

DAA 23 contains the circuitry necessary to control the electrical parameters of line 9 in the appropriate manner, dependent upon the status of a call, such that telephone interface 7 appears to the telephone network to be a telephone instrument. Through control of these electrical parameters, which include the d.c. loop current and the line impedance, DAA 23 goes "off-hook" when ringing voltage is detected, and goes "on-hook" when a call is complete. In both off-hook and on-hook states, analog signals received by DAA 23 from either direction are passed. CODEC 25 may also be adapted to process all signals received from the telephone network, even though DAA 23 may be in an on-hook state.

The injected analog signal on line 9 is then received along with all other signals on line 9 by analog-to-digital converter A/D 24 of CODEC 25 via DAA 23. A/D 24 converts the analog signal to a digital signal and passes the digital signal to cross correlation circuit 26. Cross correlation circuit 26 extracts the injected signal from all signals received on line 9 and passes the extracted signal to RMS circuit 27. RMS circuit 27 calculates the RMS amplitude of the extracted signal, which is then compared by comparator 28 to a threshold amplitude value stored in threshold register 29. If the amplitude of the extracted signal is less than the threshold amplitude value, a first indicator signal is generated and put onto system bus 8 over connection 11 for processing by other computer system 1 components. When the amplitude of the extracted signal then becomes greater than the threshold amplitude value, a second indicator signal is generated and put onto system bus 8.

Because all telephone instruments, including telephone interface 7 and all extension phones that may be attached to line 9, should have the standard off-hook and on-hook impedances, each extension phone that goes off-hook will cause the line impedance to decrease in a simple arithmetic progression. In particular, the first extension phone that goes off-hook (after DAA 23 goes off-hook) will cause a drop in line impedance by about a factor of two. Therefore, the threshold amplitude value does not have to be finely tuned, and may be, for example, two thirds of the detected amplitude of the injected signal.

In the present invention, the signal generated by signal generator 21 and injected onto line 9 is designed to have minimal interference with voice band signals by having the frequency of the injected signal lower than the frequency response of a standard telephone handset. Another important consideration is that the extracted signal be a faithful reproduction of the injected signal. This is governed by the rise and fall times of the telephone network. For example, if a spike signal were injected onto the network, the actual signal propagated would have more of a bell curve-like shape. This may lead to difficulties in detecting and extracting the injected signal from the line.

In the preferred embodiment, the injected signal is bell curve-like pulses, each with rise and fall times within the capabilities of the network, an example of which is shown in FIG. 3. The pulses are evenly spaced with a period sufficient to not interfere with one another and a pulse frequency low enough to not interfere with voice band traffic. Those skilled in the art will readily appreciate that other injected signal shapes and frequencies may be injected without departing from the scope and spirit of the invention.

The components of telephone interface 7 as shown in FIG. 2 are well known to those skilled in the art and are all commercially available.

In the preferred embodiment, telephone interface 7 comprises a model LS4000 Mwave DSP Adapter Card by IBM Corporation. Mwave is a trademark of IBM Corp. The LS4000 is a multitasking multimedia application system that, inter alia, provides a telephony interface which allows it to connect to the public switched telephone network (PSTN) by connecting between the PSTN and a telephone handset. The system provides a DAA, analog-to-digital and digital-to-analog converters, a programmable DSP, DTMF decoding and tone generation, FSK demodulation and data transfer capabilities, and host application interfaces through a set of Application Program Interface (API) calls. The LS4000 occupies an ISA/AT slot in an IBM-compatible personal computer.

The Mwave system is described generally in publication MMWGIMBKU-01, "The Mwave™ System Technology Description," First Edition, IBM Corp., March 1994. The LS4000 Mwave DSP Adapter Card is described in MMWLS4RDU-01, "Mwave™ System LS4000 Reference Design for MDSP1012," First Edition, IBM Corp., April 1994. Mwave development toolkits and application libraries are commercially available. The design and use of multimedia applications using Mwave technology, including computer integrated telephony applications, is well known to those skilled in the art.

The Mwave system is programmed such that the present invention runs continuously as one task of the multitasking Mwave system. At regular intervals or continuously, the local loop of line 9 is checked to determine if any extension phone is off-hook. Alternatively, the Mwave system can be programmed such that the present invention is invoked at certain specific times as required by the CTI application executing on computer system 1. When it is detected that a first extension phone goes off-hook, an indicator signal is put on system bus 8 for processing by other components and applications of computer system 1. Subsequent extension phones going off-hook do not result in the generation of more indicator signals. When it is detected that all extensions have returned to on-hook, another indicator signal is put on system bus 8.

In the present invention, the Mwave DSP Adapter Card may be modified such that firmware controlling the Analog Interface Control, analogous to CODEC 25, will process signals received from the network on line 9 under all circumstances, and not just when ringing voltage is detected or when the DAA is off-hook.

Operation of the invention is controlled by program logic typically residing in memory 5 and executed by processor 4. The program logic is preferably executed as one task in a multi-tasking computer operating system, such as the Windows operating system by Microsoft. Windows is a trademark of Microsoft Corp. The application is started when the computer system is initialized, for example by including a "shortcut" pointing to the application in the Windows Startup File, and then runs in background mode.

While specific computer hardware and software is described, it will be apparent to those skilled in the art that other hardware and software may be used within the scope of the present invention. For example, systems that are not IBM-compatible may be used. The computer operating system may be either multitask or single-task. Telephone interface 7 may be any combination of discrete and integrated components that will provide the required functionality in combination with a compatible computer system.

While a preferred embodiment of a system for detecting an off-hook extension phone in a CIT system has been particularly shown and described, it is not intended to be exhaustive nor to limit the invention to the embodiment disclosed. It will be apparent to those skilled in the art that modifications can be made to the present invention without departing from the scope and spirit thereof. It is intended that the scope of the invention be defined by the claims appended hereto and their equivalents.

What is claimed is:

1. In a computer system, a system for detecting an off-hook extension phone for use in a local loop, comprising:

a data access arrangement operated to connect said detecting system to said local loop;

means to generate an analog signal on said local loop;

means to extract said analog generated signal from the local loop signal;

means to measure the amplitude of said extracted signal; and means to compare the amplitude of said extracted signal to a predetermined threshold amplitude value and to signal to said computer system if said amplitude of said extracted signal is less than said threshold amplitude value.

2. A system for detecting an off-hook extension phone according to claim 1, wherein said generated signal is of a characteristic so as not to audibly interfere with voice band signals on said local loop.

3. A system for detecting an off-hook extension phone according to claim 2, wherein said generated signal further comprises a pulse train.

4. A system for detecting an off-hook extension phone according to claim 3, wherein each of said pulses comprise a bell-curve shape such that the rise time and fall time of said shape is within the rise time and fall time of said local loop.

5. A system for detecting an off-hook extension phone according to claim 3, wherein the frequency of said pulse train is such that said pulses do not interfere with one another.

6. A system for detecting an off-hook extension phone according to claim 1, wherein said detection system operates in a continuous manner.

7. A system for detecting an off-hook extension phone according to claim 1, wherein said detection system operates in a discrete manner in response to an execution request from said computer system.

8. A system for detecting an off-hook extension phone according to claim 1, wherein said means to generate comprises:

a digital signal generator operated to generate a digital signal of a predetermined shape and amplitude; and a digital-to-analog converter connected to said digital signal generator and operated in response to said digital generated signal to convert said digital generated signal to said analog generated signal.

9. A system for detecting an off-hook extension phone according to claim 8, wherein said means to extract comprises:

an analog-to-digital converter connected to said data access arrangement and operated in response to said local loop signal to convert said local loop signal to a digital a signal; and a cross correlation circuit connected to said analog-to-digital converter and said signal generator and operated in response to said digital generated signal and said digital local loop signal to extract said digital generated signal from said digital local loop signal.

10. A system for detecting an off-hook extension phone according to claim 1, wherein said detecting system comprises a multimedia application system, comprising:

said data access arrangement;

said means to generate;

said means to extract;

said means to measure; and said means to compare.

11. A system for detecting an off-hook extension phone according to claim 1, wherein said detecting system comprises a multimedia application system adapted to process all analog signals from said network while said multimedia application system is in an on-hook state, said multimedia application system comprising:

said data access arrangement;

said means to generate;

said means to extract;

said means to measure; and said means to compare.

\* \* \* \* \*